United States Patent

Hara

[11] Patent Number: 5,985,109
[45] Date of Patent: Nov. 16, 1999

[54] ELECTROLYTIC CELL

[75] Inventor: Yasuo Hara, Ohara-gun, Japan

[73] Assignee: Hoshizaki Denki Kabushiki Kaisha, Aichi-ken, Japan

[21] Appl. No.: 09/040,932

[22] Filed: Mar. 19, 1998

[51] Int. Cl.$^6$ .............................. C25B 9/00; C25B 15/08
[52] U.S. Cl. ......................................... 204/257; 204/263
[58] Field of Search ................................... 204/263–266, 204/255–256, 257–258

[56] References Cited

U.S. PATENT DOCUMENTS

| | | | |
|---|---|---|---|
| 4,420,387 | 12/1983 | Bergner et al. | 204/263 |
| 5,372,689 | 12/1994 | Carlson et al. | 204/263 X |
| 5,667,647 | 9/1997 | Suga et al. | 204/263 X |
| 5,766,431 | 6/1998 | Tanaka et al. | 204/263 |

FOREIGN PATENT DOCUMENTS

| | | |
|---|---|---|
| 05123676 | 5/1993 | Japan . |
| 3004000 | 8/1994 | Japan . |

*Primary Examiner*—Donald R. Valentine
*Attorney, Agent, or Firm*—Hazel & Thomas, PC

[57] ABSTRACT

An electrolytic cell composed of a cell housing formed at a lower portion thereof with a pair of inlet ports and at an upper portion thereof with a pair of outlet ports, a diaphragm assembled within the housing to subdivide the interior of the housing into a pair of reaction chambers respectively in open communication with the inlet and outlet ports, and a pair of electrode plates disposed within the reaction chambers respectively and opposed to one another through the diaphragm, wherein the electrode plates are applied with electric current to electrolyze water to be treated flowing therethrough from the inlet ports toward the outlet ports, a horizontal partition is provided in the respective reaction chambers to form a plurality of reaction passages between the diaphragm and the respective electrode plates in such a manner that the reaction passages are opened at their opposite ends, a pair of communication passages are formed at opposite sides of each of the electrode plates to alternately connect the opposite ends of the reaction passages therethrough so that a meander passage is formed by the reaction passages and communication passages, and an inlet cavity in open communication with the inlet port is formed at one side of the respective electrode plates and connected with a lower end of the meander passage, while an outlet cavity in open communication with the outlet port is formed at the other side of the respective electrode plates and connected with an upper end of the meander passage.

3 Claims, 19 Drawing Sheets

ELECTROLYTIC CELL

BACKGROUND OF THE INVENTION

1. Field of the Invention

The present invention relates to an electrolytic cell for electrolysis of water to be treated.

2. Description of the Prior Art

Disclosed in Japanese Patent Laid-open Publication No. 5-123676 is an electrolytic cell of the type which includes a cell housing formed with a pair of inlet ports and a pair of outlet ports, a diaphragm assembled within the housing to subdivide the interior of the housing into a pair of reaction chambers respectively in open communication with the inlet and outlet ports, and a pair of electrode plates disposed within the reaction chambers respectively and opposed to one another through the diaphragm, wherein the electrode plates are applied with electric current to electrolyze water to be treated flowing therethrough from the inlet ports toward the outlet ports. Disclosed also in Japanese Utility Model Publication No. 3004000 is an electrolytic cell wherein a partition plate formed with a meander groove is disposed between the diaphragm and each of the electrode plates. In the case that the prior art disclosed in Japanese Utility Model Publication No. 300400 is adapted to the electrolytic cell disclosed in Japanese Patent Laid-open Publication No. 5-123676 for meandering introduced water, undesired substances such as bubbles, scales and the like adhered to surfaces of the electrode plates can be removed by the flow of water to enhance the electrolytic efficiency of water.

In the prior art disclosed in Japanese Utility Model Publication No. 300400, however, a meander groove formed in the partition plate reduces an active area of the respective electrode plates at its curved portions. This cause an increase of density of electric current applied to the electrode plates at each curved portion of the meander groove, resulting in damage of the electrode plates in a short period of time. In addition, as the undesired substances flowed with the water are accumulated at the outlet ports, the electrolytic efficiency of water is deteriorated.

SUMMARY OF THE INVENTION

The present invention was made to solve the problems discussed above.

According to the present invention, there is provided an electrolytic cell composed of a cell housing formed at a lower portion thereof with a pair of inlet ports and at an upper portion thereof with a pair of outlet ports, a diaphragm assembled within the housing to subdivide the interior of the housing into a pair of reaction chambers respectively in open communication with the inlet outlet ports, and a pair of electrode plates disposed within the reaction chambers respectively and opposed to one another through the diaphragm, wherein the electrode plates are applied with electric current to electrolyze water to be treated flowing therethrough from the inlet ports toward the outlet ports, a horizontal partition is provided in the respective reaction chambers to form a plurality of reaction passages between the diaphragm and the respective electrode plates in such a manner that the reaction passages are opened at their opposite ends, a pair of communication passages are formed at opposite sides of each of the electrode plates to alternately connect the opposite ends of the reaction passages therethrough so that a meander passage is formed by the reaction passages and communication passages, and an inlet cavity in open communication with the inlet port is formed at one side of the respective electrode plates and connected with a lower end of the meander passage, while an outlet cavity in open communication with the outlet port is formed at the other side of the respective electrode plates and connected with an upper end of the meander passage.

In the electrolytic cell, it is preferable that the communication passages are formed larger in passage area than the reaction passages, respectively, and it is also desirable that the inlet cavity is communicated with the communication passage located above through a small through hole or a slight clearance, while the outlet cavity is communicated with the communication passage located below through a small through hole or a slight clearance.

In the electrolytic cell according to the present invention, water to be treated is supplied into the inlet cavities from the inlet ports and flows into the outlet cavity through the meander passages during which the water is applied with electrolytic treatment between the electrode plates to discharge electrolyzed water from the outlet ports. As the meander passages each are formed by the reaction passages and communication passages among the partition frames, diaphragm and electrode plates, the reaction passages are located only between the electrode plates. This is useful to provide a sufficient active area of the electrode plates and to decrease density of electric current applied to the electrode plates for restraining damage of the electrode plates. In addition, as the communication passages are formed at the both sides of the respective electrode plates, the electrolytic efficiency of the water is ensured without any deterioration even if bubbles and scales are accumulated in the communication passages.

In the case that the communication passages are formed larger in passage area than the reaction passages to retard the flow velocity of water at a portion where the flow direction of water is reversed, it is able to flow the water to be treated as a laminar flow at the entire region of the reaction passages without causing accumulation of bubbles and scales. This is useful to uniformly effect electrolytic treatment at the entire region of the reaction passages. Furthermore, retard of the flow velocity at the communication passages is effective to accumulate the bubbles and scales separated from the water in the communication passages. This is also useful to enhance the electrolytic efficiency of water.

In the case that the inlet chamber Ra is communicated with the communication passage through the small through hole or slight clearance, while the communication passage is communicated with the outlet cavity through the small through hole or slight clearance, the air mixed with the water is discharged by buoyancy from the inlet cavity into the upper communication passage through the through hole or slight clearance, while the bubbles accumulated in the lower communication passage are discharged by buoyance into the outlet cavity through the through hole or slight clearance. With such an arrangement as described above, the amount of bubbles flowing through the reaction passages can be decreased to enhance the electrolytic efficiency of water.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
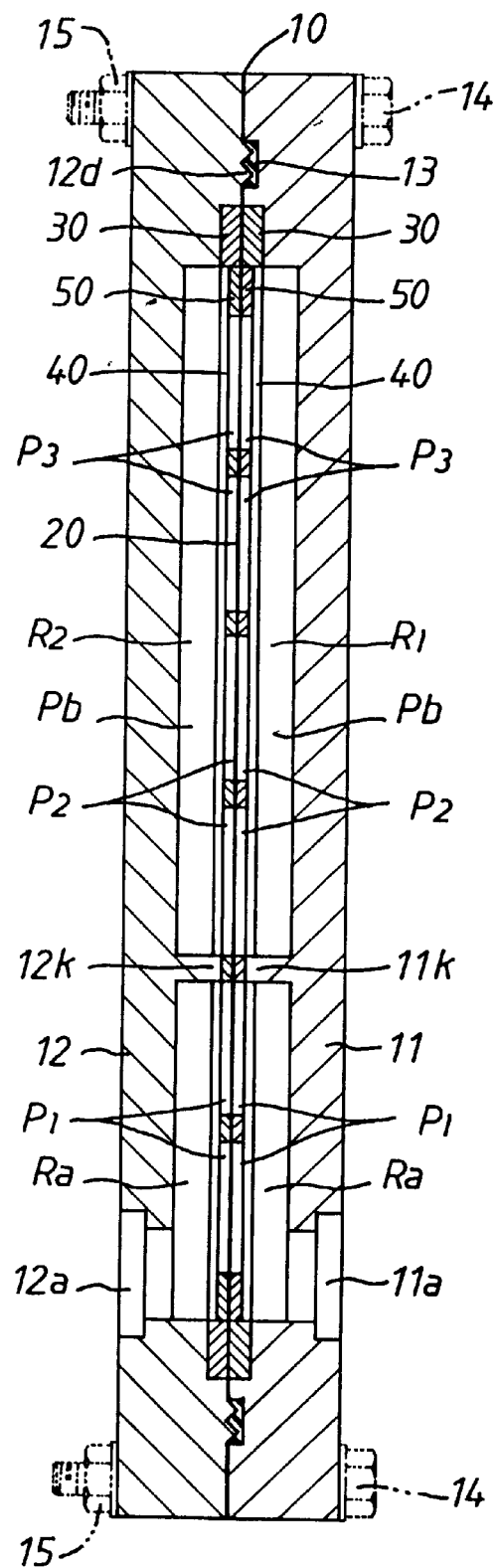
FIG. 1 is a vertical sectional view of an embodiment of an electrolytic cell in accordance with the present invention, taken along line 6—6 in FIG. 5 and line 10—10 in FIG. 9.
Figure 2:
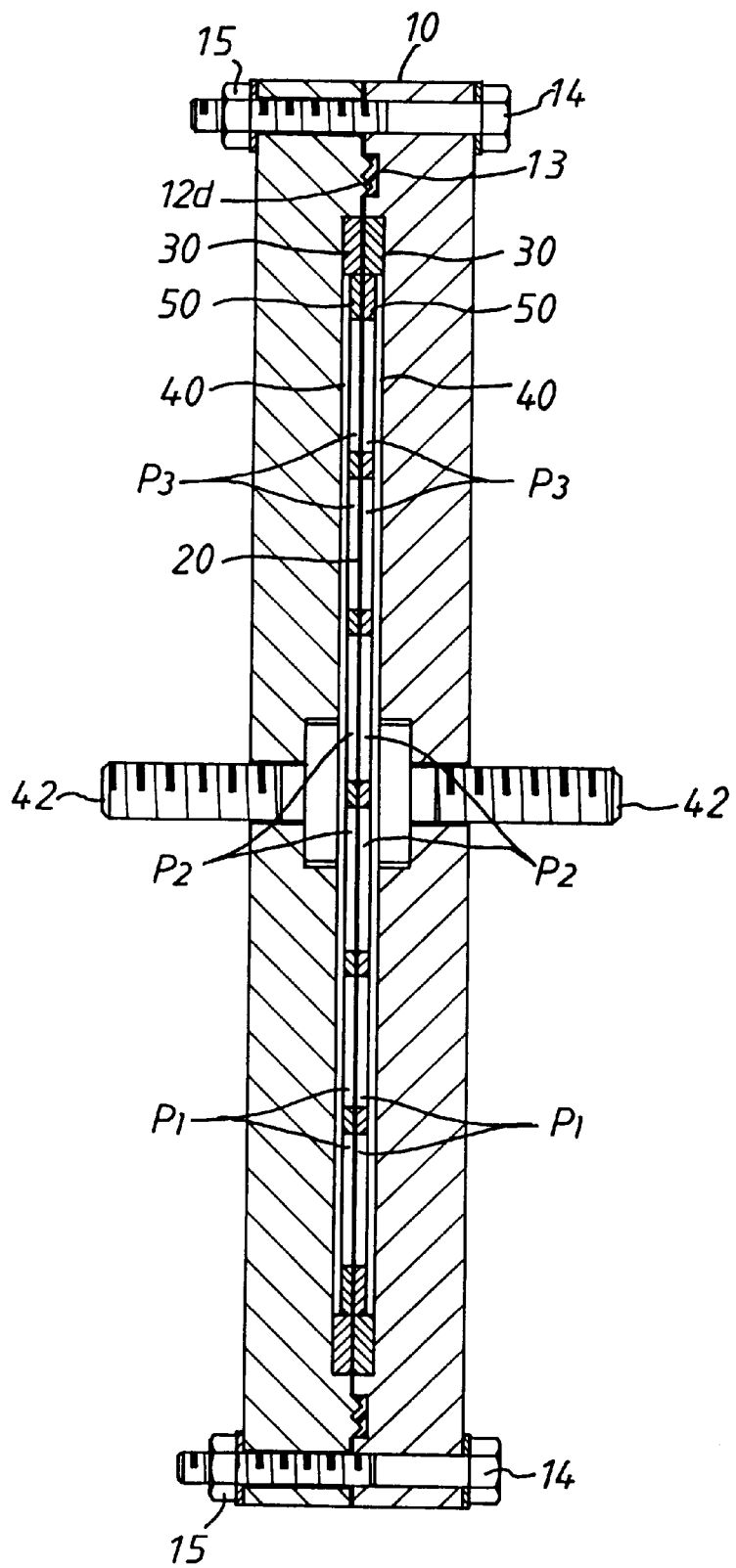
FIG. 2 is a vertical sectional view of the electrolytic cell taken along line 7—7 in FIG. 5 and line 11—11 in FIG. 9.
Figure 3:
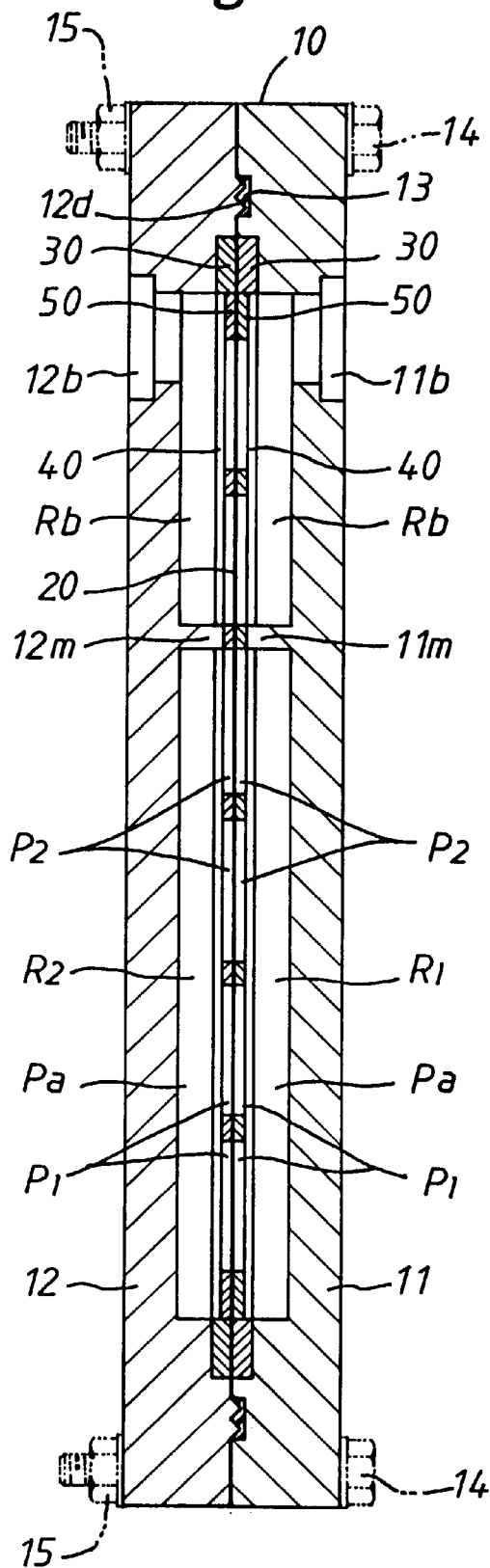
FIG. 3 is a vertical sectional view of the electrolytic cell taken along line 8—8 in FIG. 5 and 12—12 in FIG. 9.

Hereinafter, an embodiment of the present invention will be described with reference to FIGS. 1 to 17 of the drawings. An electrolytic cell according to the present invention includes a housing 10 formed at its lower portion with a pair of inlet ports 11a and 12a as shown in FIG. 1 and at its upper portion with a pair of outlet ports 11b and 12b as shown in FIG. 3, a diaphragm 20 assembled within the housing 10 to subdivide the interior of housing 10 into a pair of rectangular reaction chambers R1 and R2 respectively in open communication with the inlet ports 11a, 12a and outlet ports 11b, 12b, and each pair of frame 30, electrode plates 40 and partition frames 50 disposed in the reaction chambers R1 and R2 and opposed to one another through the diaphragm 20. As shown in FIG. 2, the electrode plates 40 each are provided with a terminal bolt 42 which is selectively connected to positive and negative terminals of a DC current power source (not shown) through a leading wire. When applied with DC current, the electrode plates 40 are activated to effect electrolysis of water flowing therethrough from the inlet ports 11a, 12a toward the outlet ports 11b, 12b.

As shown in FIG. 1 to 12, the housing 10 is composed of a pair of housing shells 11 and 12 made of insulation resin, a rectangular packing 13 disposed between the housing shells 11 and 12 in a liquid-tight manner, and a plurality of bolts and nuts 14 and 15 connecting the housing shells 11 and 12 to one another.

As shown in FIGS. 4 to 8, the right-hand housing shell 11 is formed with the inlet and outlet ports 11a and 11b, a stepped hole 11c for penetrating the terminal bolt 42 therethrough, a rectangular groove 11d for containing the packing 13, a plurality of bolt holes 11e, a rectangular recess 11f for containing the frame 30, electrode plate 40 and partition frame 50, an inlet cavity 11g located at an inner end of inlet port 11e, and an outlet cavity 11h located at an inner end of outlet port 11b. The housing shell 11 is further formed with vertical cavities or recesses 11i and 11j respectively corresponding with the inlet and outlet cavities 11g and 11h, a lateral partition wall 11k located between the inlet cavity 11g and vertical cavity or recess 11i, and a lateral partition wall 11m located between the outlet cavity 11h and vertical recess 11j.

As shown in FIGS. 9 to 12, the left-hand housing shell 12 is formed with the inlet and outlet ports 12a and 12b, a stepped hole 12c for penetrating the terminal bolt 42 therethrough, two rectangular ridges 12d for deforming the packing 13 and diaphragm 20 under pressure (as shown in FIGS. 1 to 3), a plurality of bolt holes 12e, a rectangular recess 12f for containing the frame 30, electrode plate 40 and partition frame 50, an inlet cavity 12g located at an inner end of inlet port 12a, and an outlet cavity 12h located at an inner end of outlet port 12b. The housing shell 12 is further formed with vertical cavities or recesses 12i and 12j respectively corresponding with the inlet and outlet cavities 12g and 12h, a lateral partition wall 12k located between the inlet cavity 12g and vertical recess 12i, and a lateral partition wall 12m located between the outlet cavity 12h and vertical recess 12j.

Figure 13:
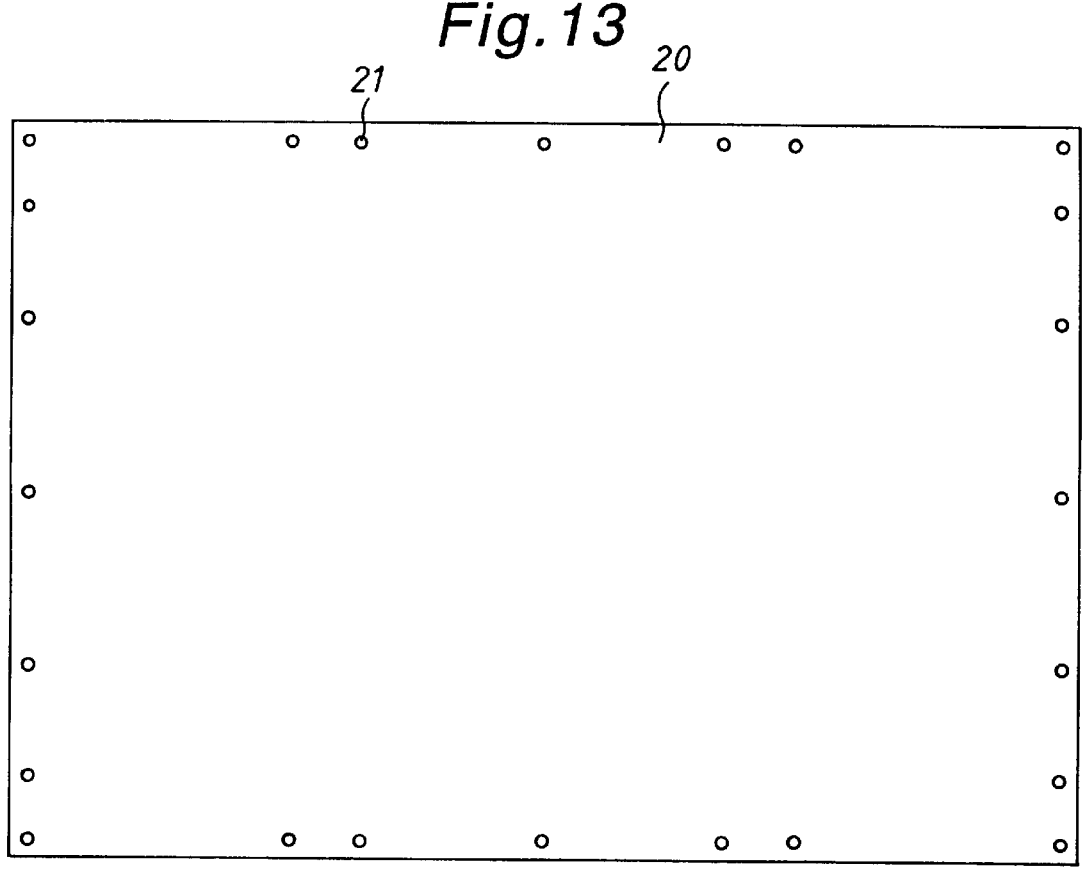
FIG. 13 a front view of a diaphragm shown in FIGS. 1 to 3.

The diaphragm 20 is in the form of a porous thin membrane of 0.12 mm in thickness made of polyester non-woven cloth. As shown in FIG. 13, the diaphragm 20 is cut out approximately in the same size as each of the housing shells 11, 12 and is formed with bolt holes 21 positioned to coincide with the bolt holes 11e, 12e. The diaphragm 20 is clamped by peripheral portions of the housing shells 11 and 12 in a liquid-tight manner in a condition where it has been assembled as shown in FIGS. 1 to 3.

Figure 4:
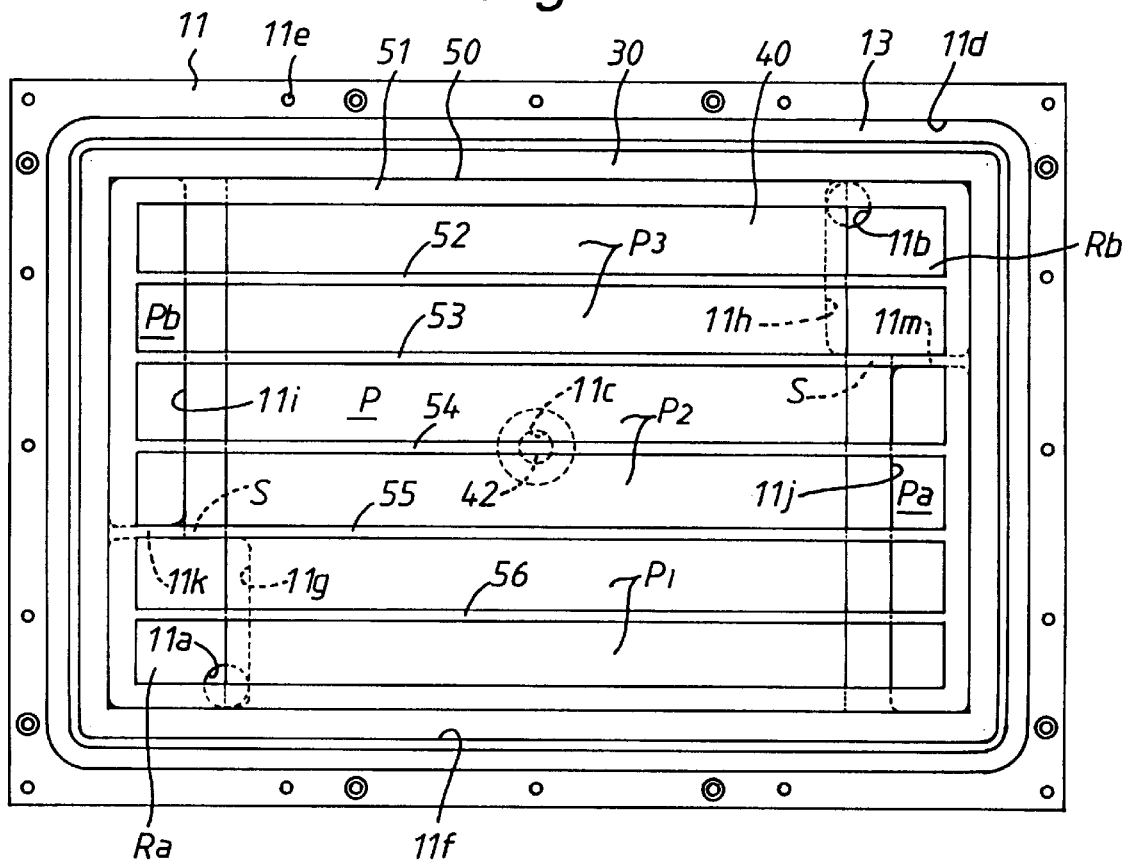
FIG. 4 illustrates a frame, an electrode plate and a partition frame assembled within a right-hand housing shell shown in FIGS. 2 and 3.
Figure 5:
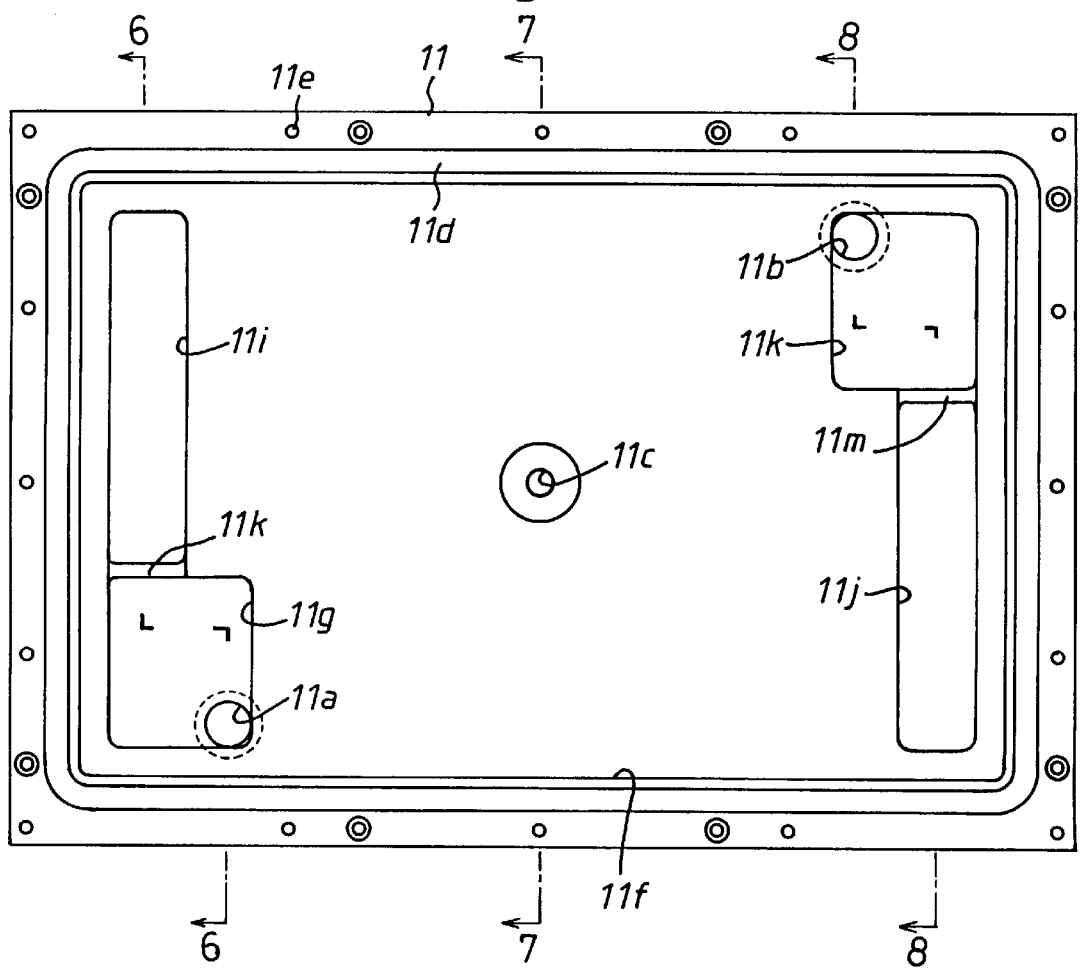
FIG. 5 is a front view of the right-hand housing shell shown in FIGS. 1 to 3.
Figure 6:
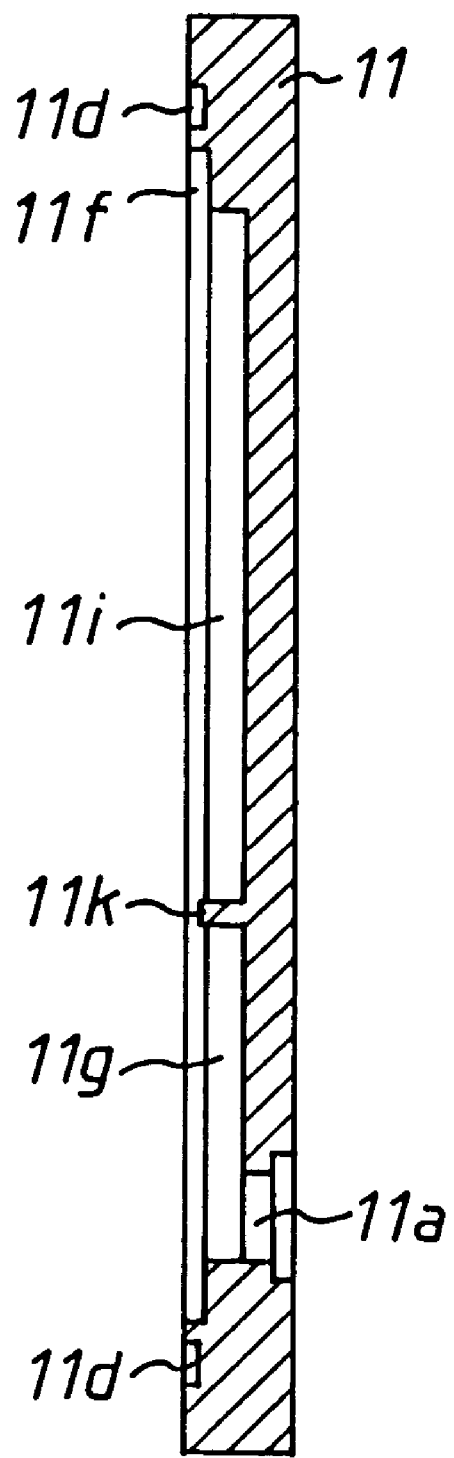
FIG. 6 is a sectional view of the right-hand housing shell taken along line 6—6 in FIG. 5.
Figure 7:
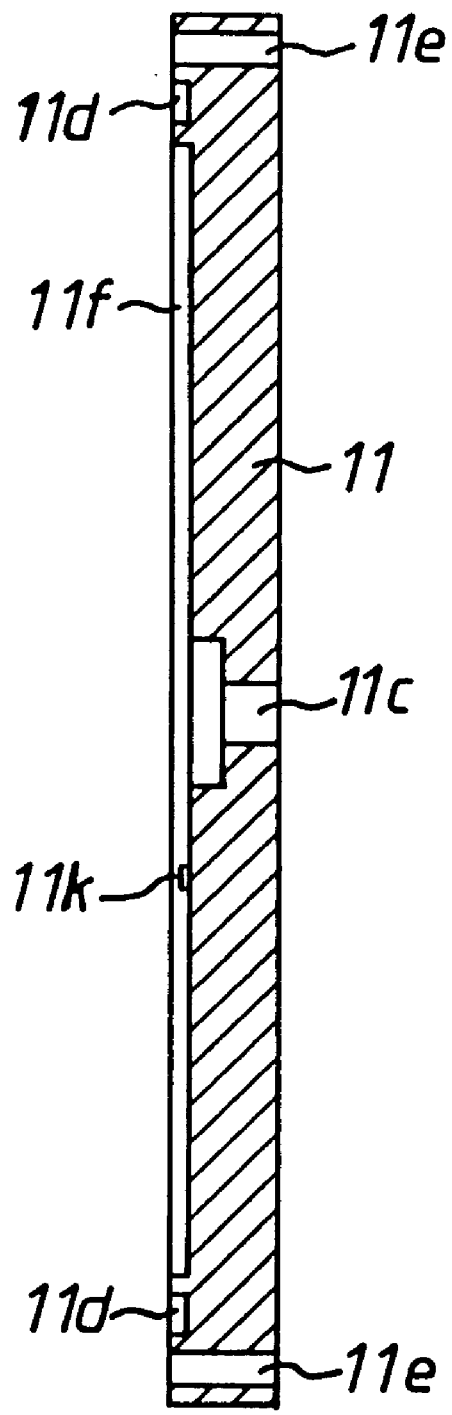
FIG. 7 is a sectional view of the right-hand housing shell taken along line 7—7 in FIG. 5.
Figure 8:
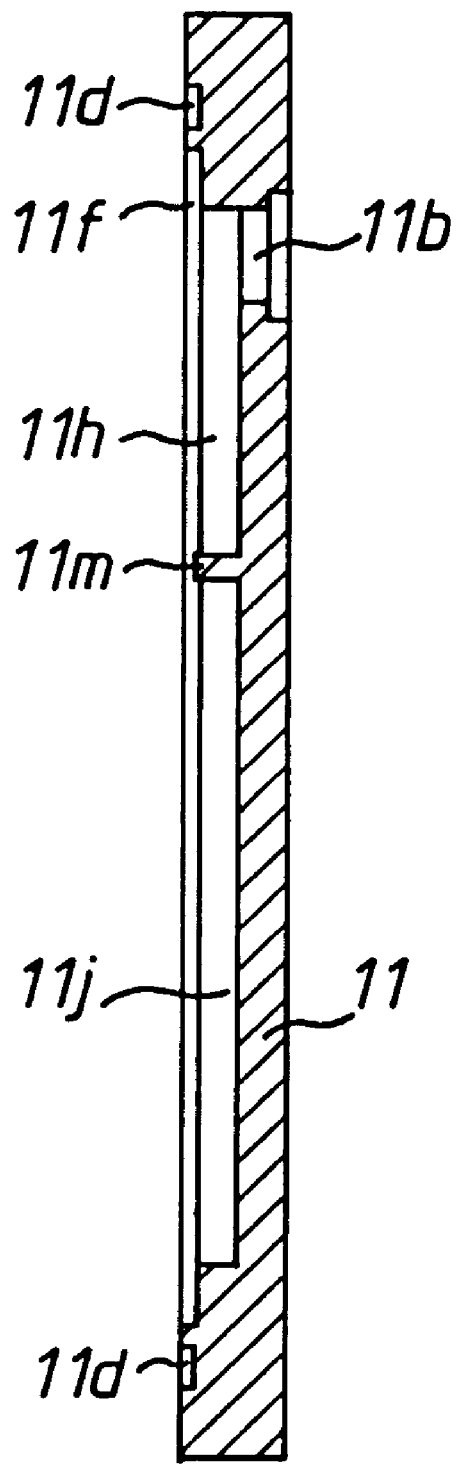
FIG. 8 is a sectional view of the right-hand housing shell taken along line 8—8 in FIG. 5.
Figure 9:
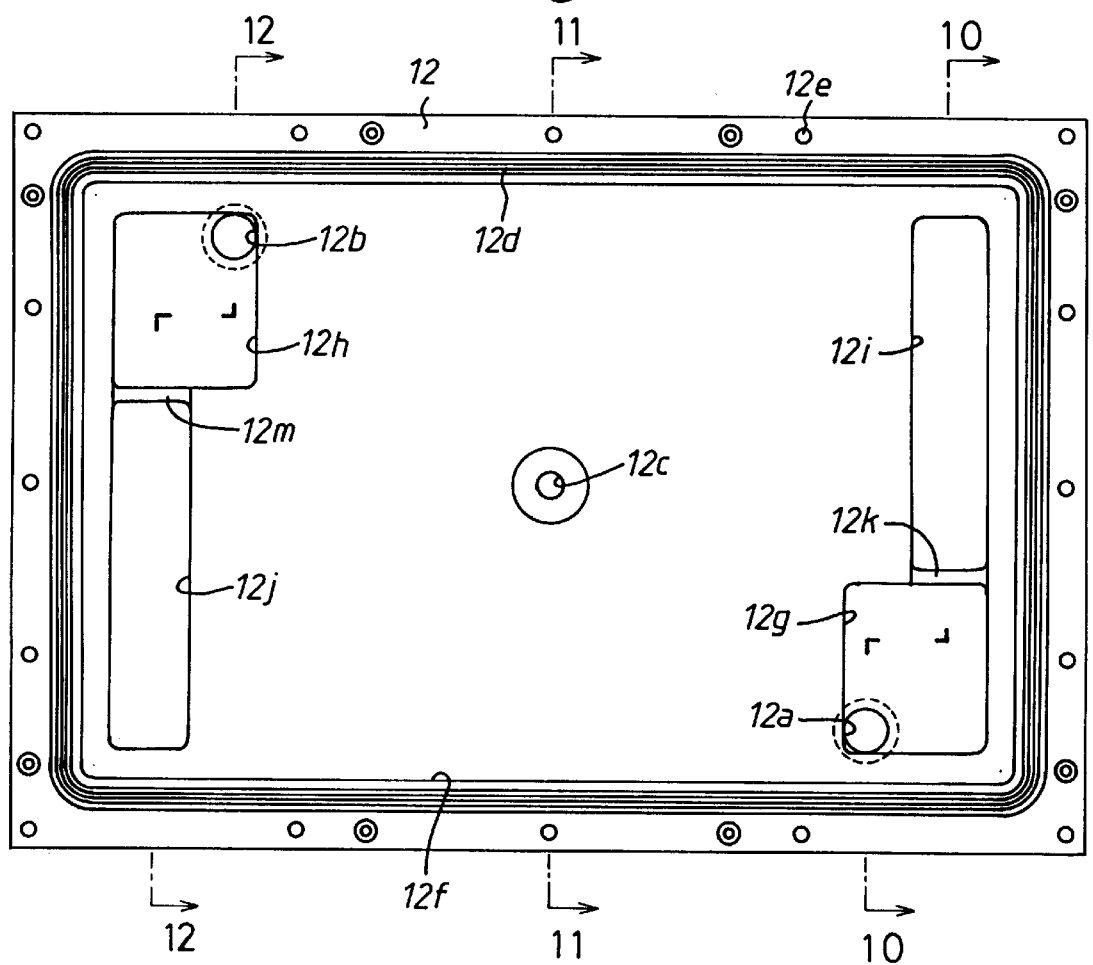
FIG. 9 is a front view of a left-hand housing shell shown in FIGS. 1 to 3.
Figure 10:
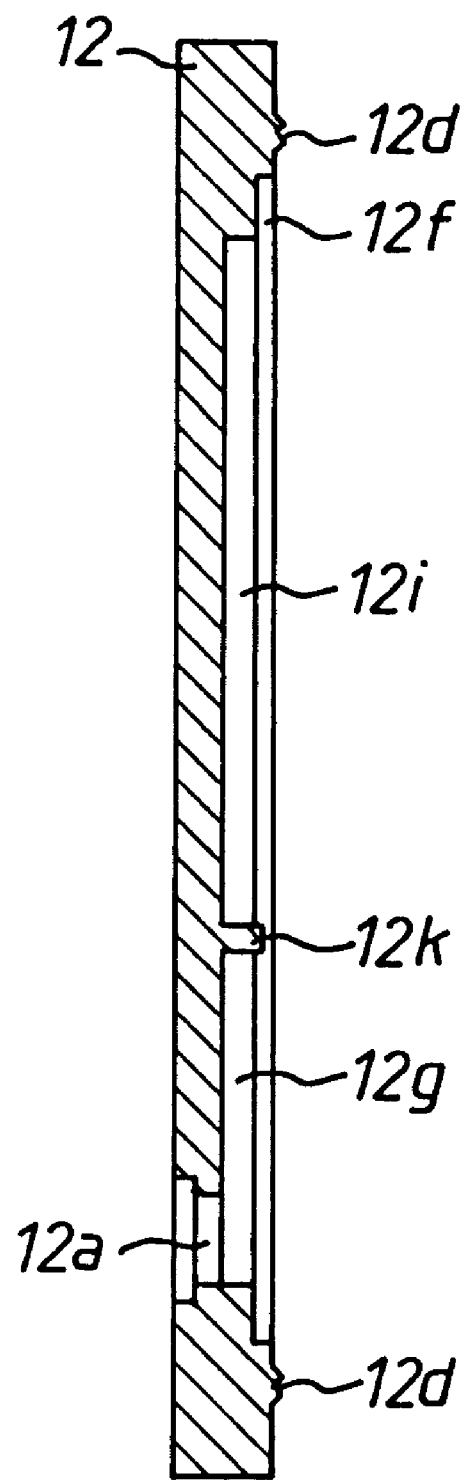
FIG. 10 is a sectional view of the left-hand housing shell taken along line 10—10 in FIG. 9.
Figure 11:
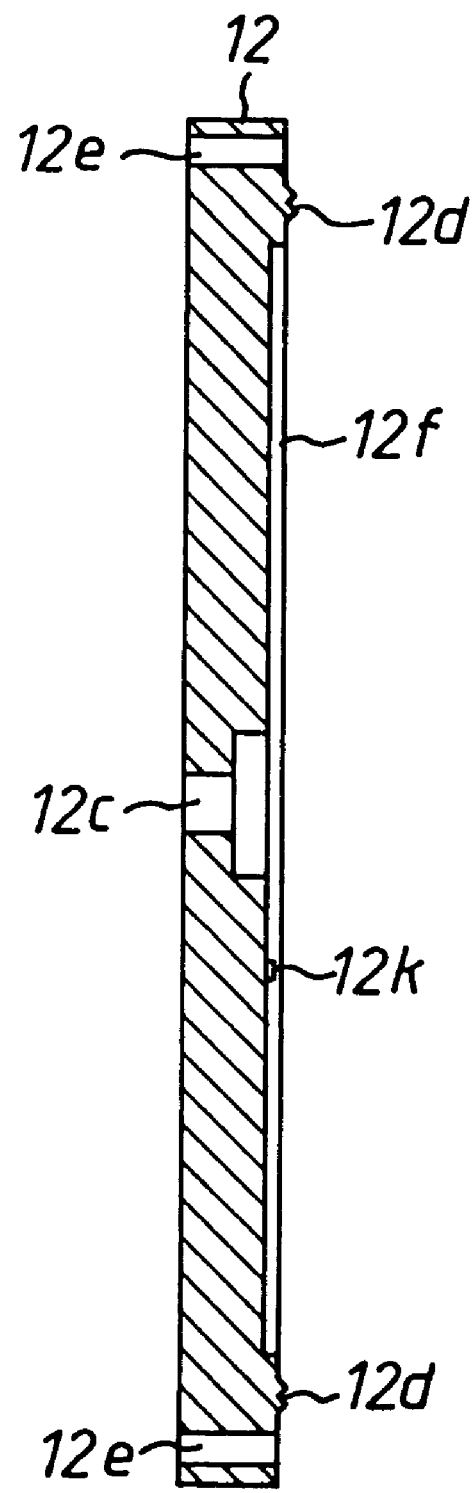
FIG. 11 is a sectional view of the left-hand housing shell taken along line 11—11 in FIG. 9.
Figure 12:
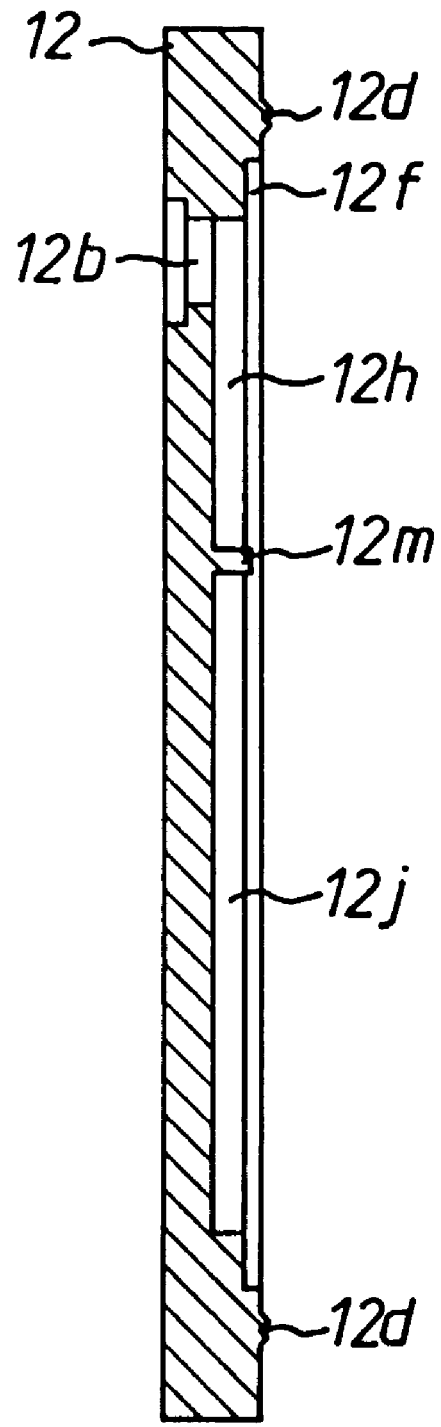
FIG. 12 is a sectional view of the left-hand housing shell taken along line 12—12 in FIG. 9.
Figure 14:
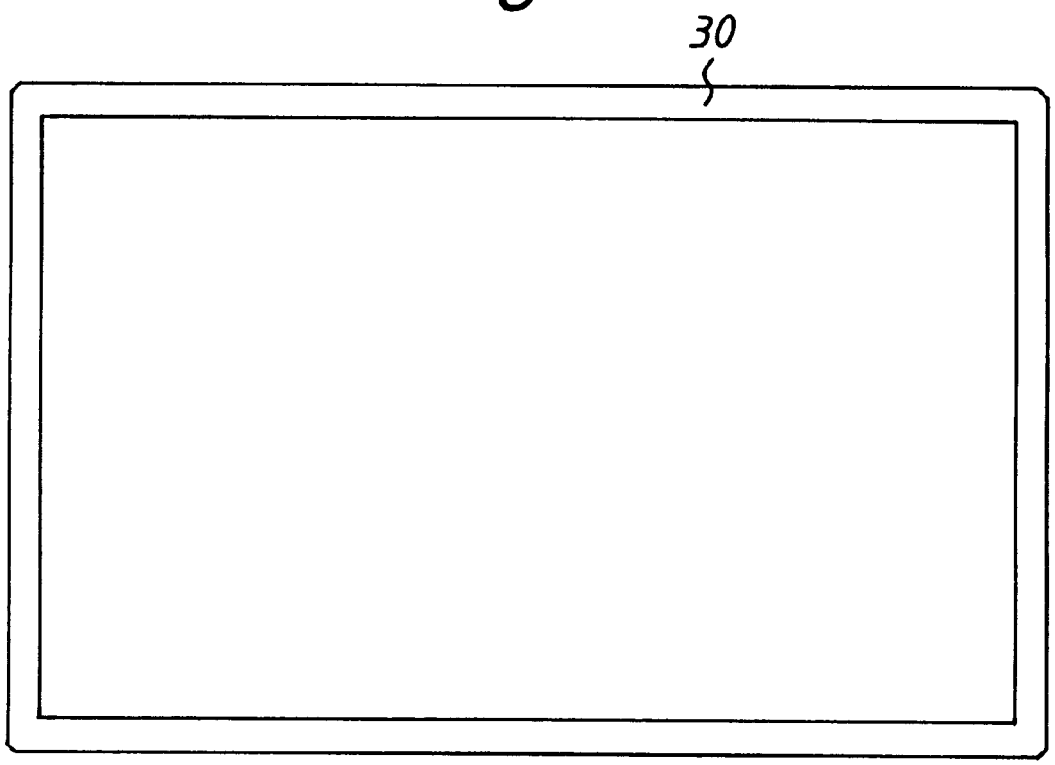
FIG. 14 is a front view of the frame shown in FIGS. 1 to 4.

As shown in FIG. 14, the frames 30 each are in the form of a rectangular frame made of insulation resin which is formed to be coupled within the respective recesses 11f, 12f in the housing shells 11, 12. The thickness of the respective rectangular frames 30 is approximately the same as each depth of the recesses 11f, 12f in the housing shells 11, 12. The rectangular frames 30 are assembled within the recesses 11f, 12f together with the electrode plates 40 and partition frames 50, as shown in FIG. 4.

Figure 15:
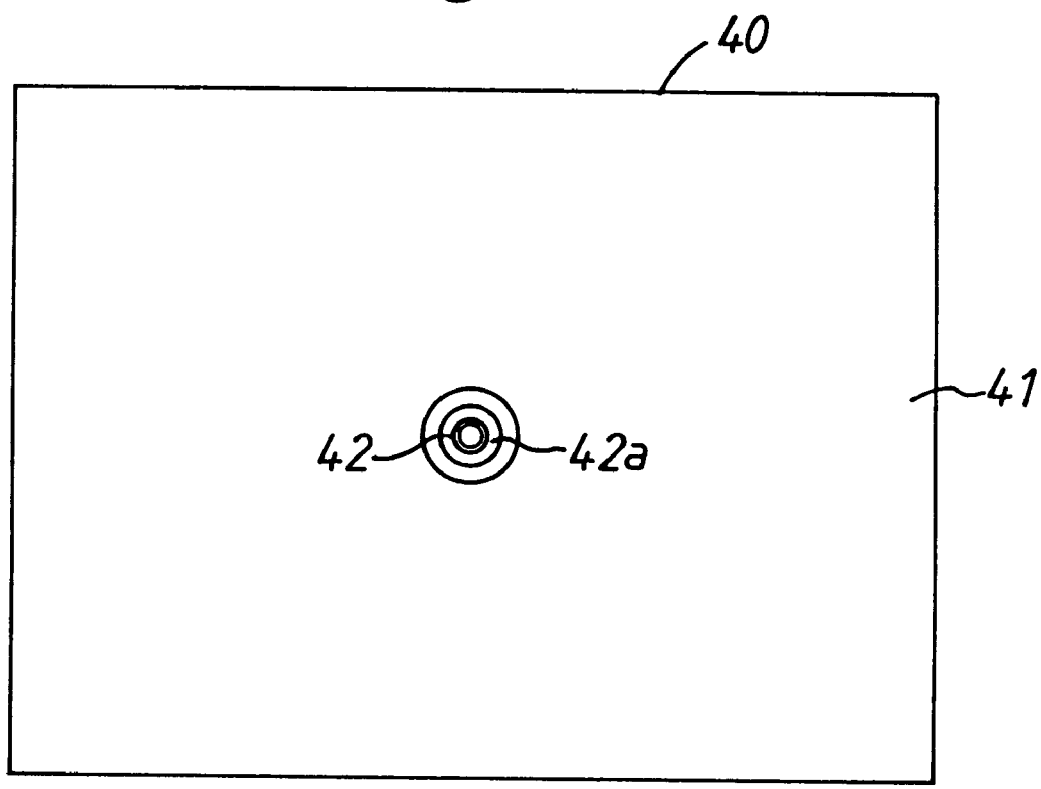
FIG. 15 is a rear view of the electrode plate shown in FIGS. 1 to 3.
Figure 16:
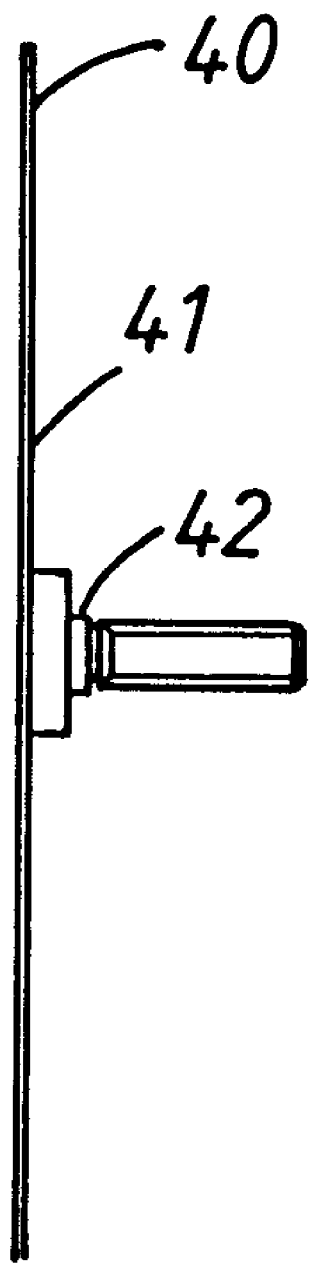
FIG. 16 is a side view of the electrode plate shown in FIGS. 1 to 4.
Figure 17:
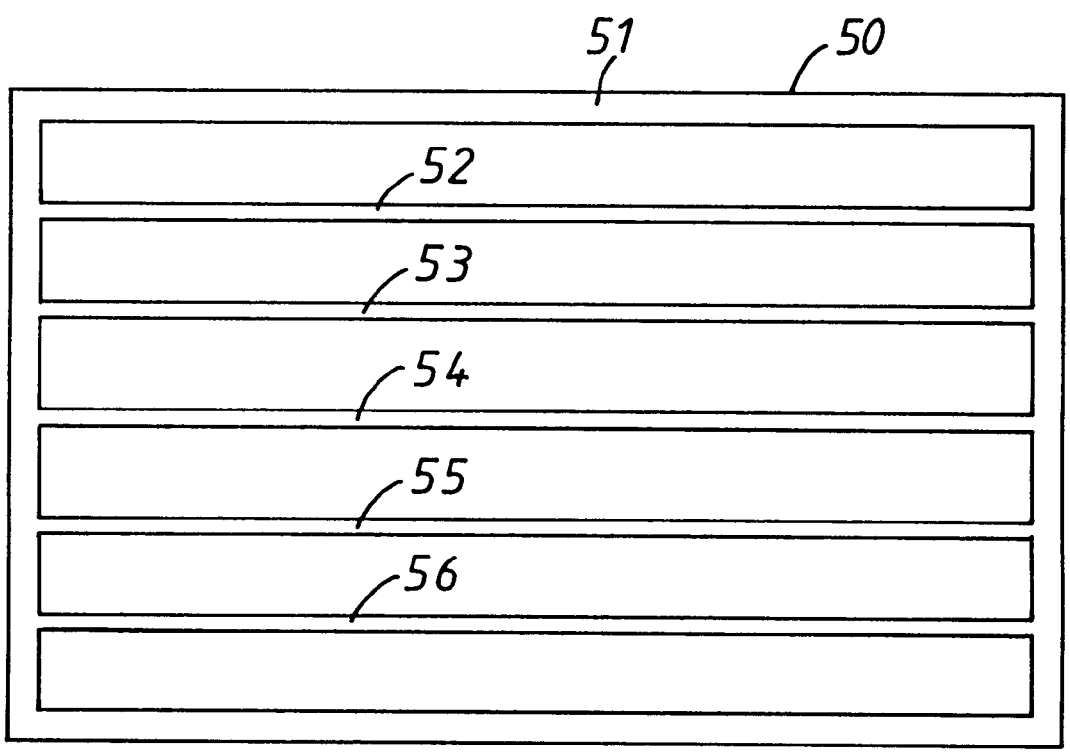
FIG. 17 is a front view of the partition frame shown in FIGS. 1 to 4.

As shown in FIGS. 1 to 3, 15 and 16, the electrode plates 40 each are in the form of a rectangular electrode plate 41 thinner than the frame 30. The terminal bolt 42 is welded at its head portion to each rear surface of the electrode plates 40. As shown in FIG. 15, the head portion of terminal bolt 42 is formed at its rear end face with an annular groove 42 in which an O-ring is contained to close the respective bolt holes 11c, 12c in a liquid-tight manner. The electrode plates 40 are assembled within the rectangular recesses 11f, 12f of housing shells 11, 12 respectively in such a manner that the electrode plates 40 are closely in contact with each bottom surface of the recesses 11f, 12f at their rear surfaces. In a condition where the electrode plates 40 have been assembled within the rectangular recesses 11f, 12f of housing shells 11, 12, the inlet and outlet cavities 11g, 12g and 11h, 12h are partially covered with the electrode plates 40, as shown in FIG. 4.

As shown in FIGS. 1 to 4 and 17, the partition frames 50 each are composed of a rectangular frame 51 formed to be coupled within the frame 30 and five horizontal cross-pieces 52–56 integrally formed with the rectangular frame 50. The partition frames 50 each are made of insulation resin plate the thickness of which corresponds with a difference in thickness of the frame 30 and electrode plate 41. In a condition where the partition frames 50 have been assembled within the housing shells 11 and 12, the rectangular frame 51 is retained at its rear surface in contact with each front surface of the electrode plates 40, and the cross-pieces 53 and 54 are retained at their one end portions in contact with the respective partition walls 11m, 11k and 12m, 12k formed in the housing shells 11, 12. The partition frames 50 are retained at their front surfaces in contact with the diaphragm 20 as shown in FIGS. 1 to 3. In actual practices, the partition frames 50 each may be formed without the cross-pieces 52, 54, 56.

In the electrolytic cell A constructed in such a manner as described above, three pairs of horizontal reaction passages P1, P2 and P3 are formed by the partition frames 50 and electrode plates 40 at both faces of the diaphragm 20. The reaction passages P1, P2 and P3 are approximately the same in their passage area and opened at their opposite ends. At the both sides of the respective electrode plates 40, the reaction passages P1, P2 and P3 are alternately communicated with each other at their one ends through vertical passages Pa, Pb formed by the vertical recesses 11j, 12j and 11i, 12i of the housing shells 11 and 12. The vertical passages Pa, Pb each are formed larger in passage area than the reaction passages P1, P2, P3. Thus a meander passages P is formed by the reaction passages P1, P2, P3 and vertical passages Pa, Pb respectively at opposite faces of the diaphragm 20. One end of the meander passage P is communicated with an inlet chamber Ra formed by the respective inlet cavities 11g, 12g of housing shells 11, 12 at the left-hand lower portion of the respective electrode plates 40, while the other end of the meander passage P is communicated with an outlet chamber Rb formed by the respective outlet cavities 11h, 12h of housing shells 11, 12 at the right-hand upper portion of the respective electrode plates 40.

In the electrolytic cell A, the inlet chamber Ra and outlet chamber Rb are communicated with the vertical passages Pb and Pa respectively through slight clearances S formed between each bottom surface of the rectangular recesses 11f, 12f and the cross-pieces 53, 55 of partition frame 50 at the both sides of the respective electrode plates 40 adjacent the partition walls 11k, 11m. In the case that the partition walls 11k, 11m are extended to the both sides of the respective electrode plates 40, a vertical small through hole may be formed in the respective partition walls 11k, 11m or the respective cross-pieces 53, 55 to communicate therethrough the inlet and outlet chambers Ra and Rb with the vertical passages Pb and Pa, respectively.

During activation of the electrolytic cell A water to be treated is supplied into the inlet chambers Ra from the inlet ports 11a, 12a and flows into the outlet chamber Rb through the meander passages P during which the water is applied with electrolytic treatment between the electrode plates 40 to discharge electrolyzed water from the outlet ports 11b, 12b. As the meander passages P each are formed by the reaction passages P1, P2, P3 and vertical passages Pa, Pb among the partition frames 50, diaphragm 20 and electrode plates 40, the reaction passages P1, P2, P3 are located only between the electrode plates 40. This is useful to provide a sufficient active area of electrode plates 40 and to decrease density of electric current applied to the electrode plates 40 for restraining damage of the electrode plates 40. In addition, as the vertical passages Pa, Pb are formed at the both sides of the respective electrode plates 40, the electrolytic efficiency of the water is ensured without any deterioration even if bubbles and scales are accumulated in the vertical passages Pa, Pb.

In the electrolytic cell A, it is noted that the vertical passages Pa, Pb are formed larger in passage area than the reaction passages P1, P2, P3 to retard the flow velocity of water at a portion where the flow direction of water is reversed. With the vertical passages Pa, Pb, it is able to flow the water to be treated as a laminar flow at the entire region of reaction passages P1, P2, P3 without causing accumulation of bubbles and scales. This is useful to uniformly effect electrolytic treatment at the entire region of reaction passages Pi, P2, P3. Furthermore, retard of the flow velocity at the vertical passages Pa, Pb is effective to accumulate the bubbles and scales separated from the water in the vertical passages Pa, Pb. This is also useful to enhance the electrolytic efficiency.

In the electrolytic cell A, the inlet chamber Ra is communicated with the vertical passage Pb through the left-hand slight clearance S so that the air mixed with the water is discharged by buoyancy from the inlet chamber Ra into the upper vertical passage Pb through the slight clearance S. Similarly, the vertical passage Pa is communicated with the outlet chamber Rb through the right-hand slight clearance S so that the bubbles accumulated in the vertical passage Pa are discharged by buoyance into the upper outlet chamber Rb through the slight clearance S. With such an arrangement as described above, the amount of bubbles flowing through the reaction passages P1, P2, P3 can be decreased to enhance the electrolytic efficiency.

Figure 18:
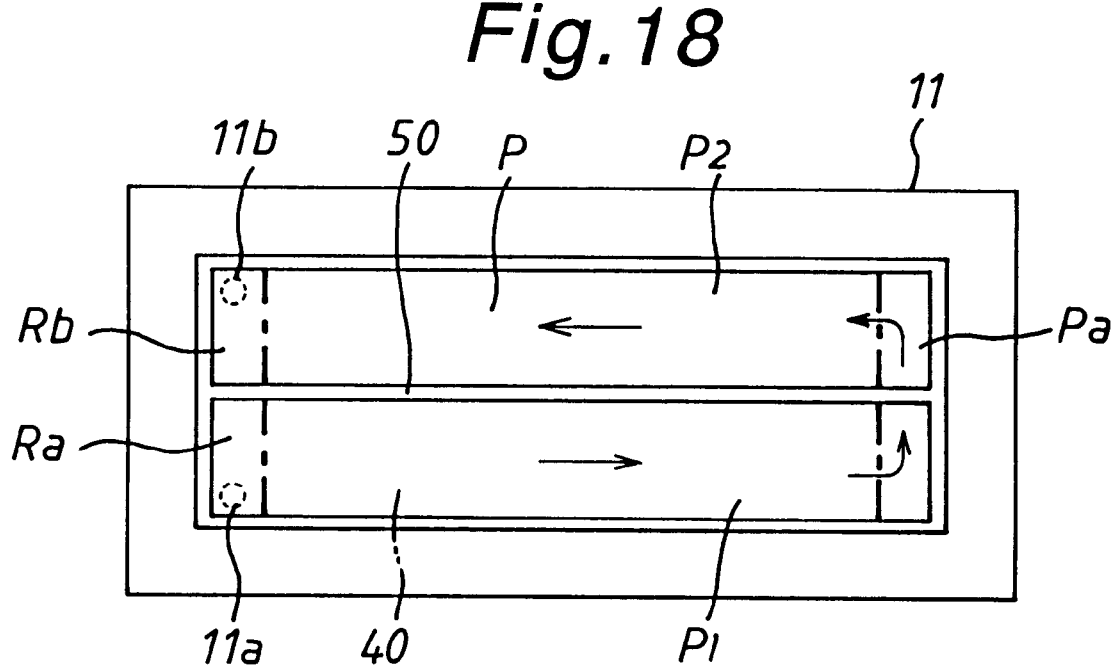
FIG. 18 illustrates another embodiment of the present invention.
Figure 19:
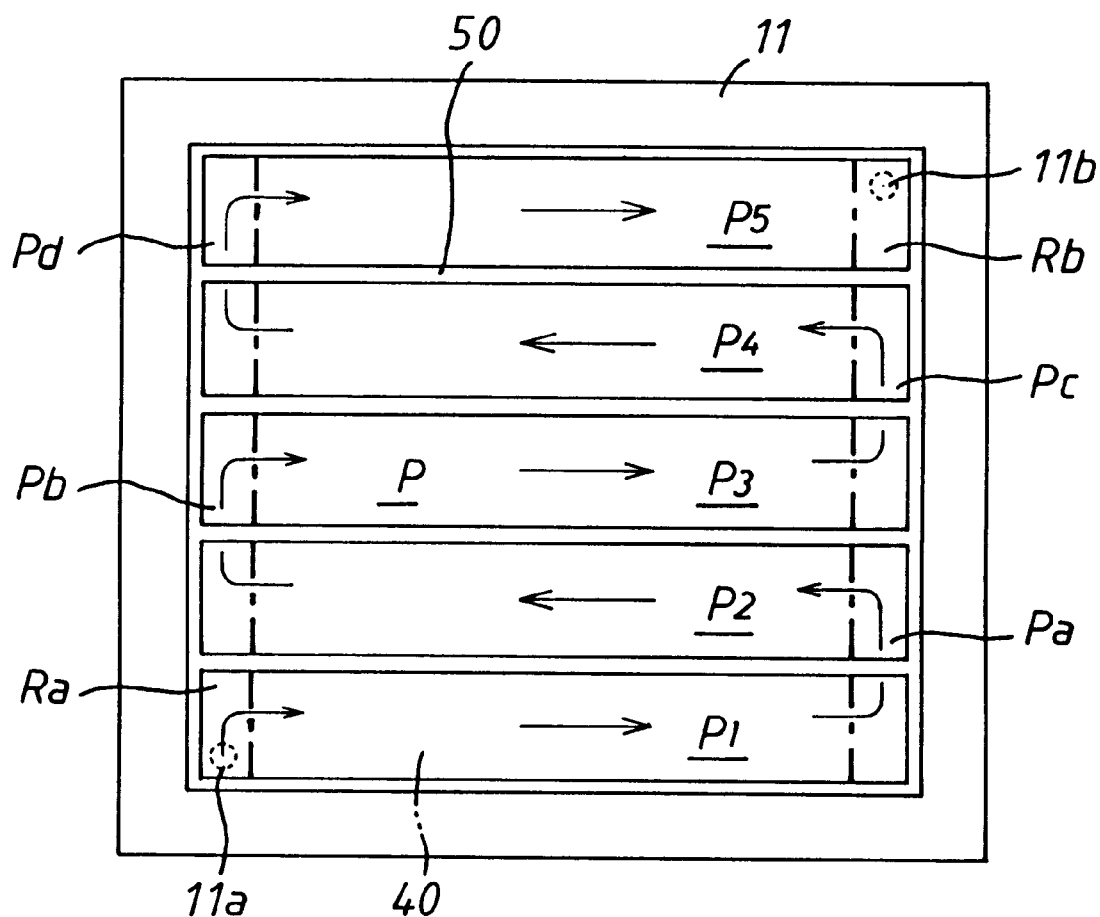
FIG. 19 illustrates a still another embodiment of the present invention.

Although in the foregoing embodiment, the meander passages P connecting the inlet chambers Ra to the outlet chambers Rb each have been formed by the three reaction passages P1, P2, P3 and the two vertical passages Pa, Pb, the meander passages P each may be formed by two reaction passages P1, P2 and one vertical passage Pa as shown in FIG. 18. Alternatively, as shown in FIG. 19, the meander passages P each may be formed by five reaction passages P1, P2, P3, P4, P5 and four vertical passages Pa, Pb, Pc, Pd.

What is claimed is:

1. An electrolytic cell composed of a cell housing formed at a lower portion thereof with a pair of inlet ports and at an upper portion thereof with a pair of outlet ports, a diaphragm assembled within the housing to subdivide the interior of the housing into a pair of reaction chambers respectively in open communication with the inlet and outlet ports, and a pair of electrode plates disposed within the reaction chambers respectively and opposed to one another through the diaphragm, wherein the electrode plates are applied with electric current to electrolyze water to be treated flowing therethrough from the inlet ports toward the outlet ports, wherein a horizontal partition is provided in the respective reaction chambers to form a plurality of reaction passages between said diaphragm and said respective electrode plates in such a manner that the reaction passages are opened at their opposite ends, wherein a pair of communication passages are formed at opposite sides of each of said electrode plates to alternately connect the opposite ends of the reaction passages therethrough so that a meander passage is formed by the reaction passages and communication passages, and wherein an inlet cavity in open communication with the inlet port is formed at one side of said respective electrode plates and connected with a lower end of the meander passage, while an outlet cavity in open communication with the outlet port is formed at the other side of said respective electrode plates and connected with an upper end of the meander passage.

2. An electrolytic cell as claimed in claim 1, wherein said communication passages are formed larger in passage area than said reaction passages, respectively.

3. An electrolytic cell as claimed in claim 1 or 2, wherein the inlet cavity is communicated with the communication passage located above through a small through hole or a slight clearance, while the outlet cavity is communicated with the communication passage located below through a small through hole or a slight clearance.

* * * * *